UNITED STATES PATENT OFFICE.

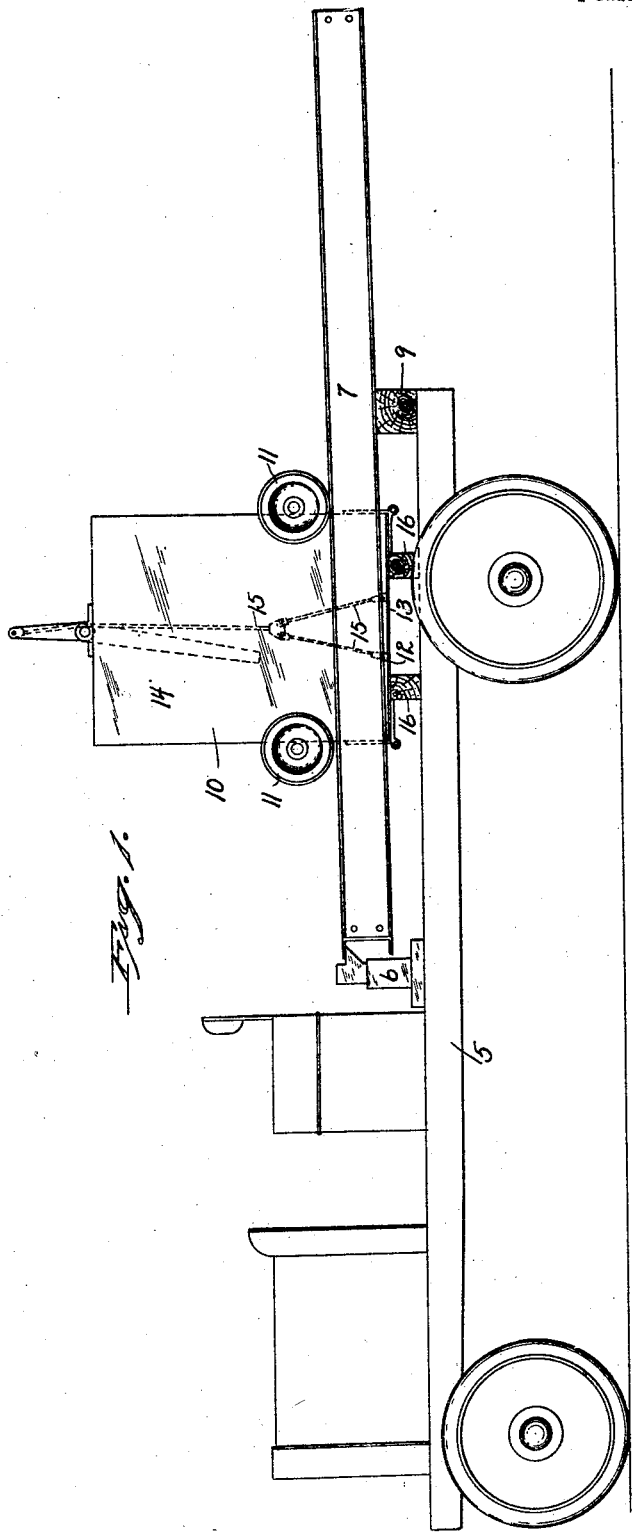

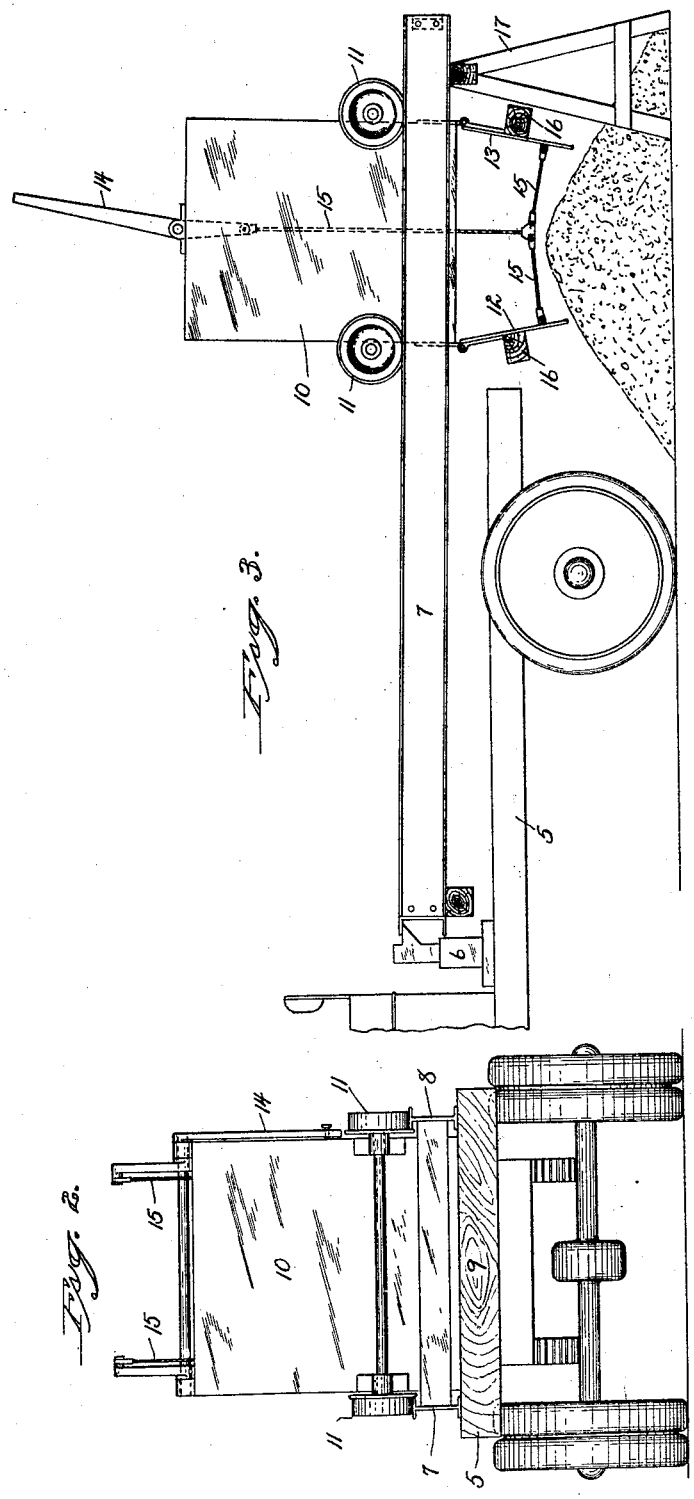

GEORGE H. MacLEAN, OF NEW HAVEN, CONNECTICUT.

TRUCK FOR TRANSFERRING CONCRETE.

1,407,698.  Specification of Letters Patent.  Patented Feb. 28, 1922.

Application filed August 2, 1921. Serial No. 489,324.

*To all whom it may concern:*

Be it known that I, GEORGE H. MACLEAN, a citizen of the United States, residing at New Haven, in the county of New Haven and State of Connecticut, have invented a new and useful Improvement in Trucks for Transferring Concrete; and I do hereby declare the following, when taken in connection with the accompanying drawings, and the characters of reference marked thereon, to be a full, clear, and exact description of the same, and which said drawings constitute part of this application and represent, in—

Fig. 1 a side view of a truck for transporting concrete constructed in accordance with my invention.

Fig. 2 a rear view of the same.

Fig. 3 a broken side view of the rear end of the truck, showing the device after discharging the contents of the container.

This invention relates to improvement in trucks for transferring concrete, and by "concrete" I wish to be understood as meaning any preparation commonly used in the construction of roads and buildings, the device, however, being particularly adapted for use in constructing roads.

The object of this invention is to provide a truck upon which a quantity of mixed concrete may be transported from one point to another and conveniently discharged, and the invention consists in the construction and arrangement of parts as hereinafter described and particularly recited in the claims.

In carrying out my invention, I employ an ordinary motor truck body 5, which is provided with an elevating-device 6 of any approved design. Mounted upon the body are two track-beams 7 and 8 which normally rest upon a bearing-block 9, so that the inclination of the tracks is toward the front of the body. The concrete-container 10 is mounted upon rollers 11 adapted to travel upon the tracks and, as herein shown, the container is closed at the bottom by two doors 12 and 13, adapted to be closed by a lever 14 through the medium of chains 15. Secured to the lower faces of the doors are blocks 16, which, when the container is in position for loading, will rest upon the top of the body 5 and hold the rollers 11 above the tops of the track-beams 7 and 8. The container is filled in any desired manner and transported to the desired point. A horse 17 or other suitable support is then placed beneath the outer ends of the tracks and the block 9 removed. The elevating-device 6 is then operated to raise the inner ends of the tracks, so as to bring the tracks against the rollers 11 and lift the container off from the bottom of the truck-body, and as the tracks then incline toward their outer ends, as shown in Figure 3 of the drawings, the container will roll outward, and when beyond the rear of the truck-body, the handle-lever 14 will be operated to open the doors in the bottom and allow the contents of the container to be discharged. When discharged, the doors are again closed and the elevating-device depressed, so that the car will run back onto the body and the supporting-block 9 is replaced and the truck ready for re-loading.

This device is readily applied to a truck of ordinary construction and may be removed when not required, so that the truck may be used for other purposes. In this way, mixed concrete is readily transported from the mixer to any desired point and easily discharged.

I claim:

1. A truck for transferring concrete, comprising a truck-body, an elevating-device mounted thereon, a pair of tracks engaged by the elevating-device and projecting beyond the rear end of the body, a container mounted on rollers adapted to bear upon said tracks, and means for opening and closing the bottom of the container.

2. A truck for transferring concrete, comprising a truck-body provided with an elevating-device, two tracks above said body and adapted to have their inner ends raised by the elevating-device, said tracks projecting beyond the rear end of the said body, a container arranged between the tracks and provided on opposite sides with rollers adapted to run upon said tracks, said container provided at its lower ends with doors, means for closing said doors, and said doors provided with blocks adapted to rest upon the said body.

In testimony whereof, I have signed this specification in the presence of two subscribing witnesses.

GEORGE H. MACLEAN.

Witnesses:
FREDERIC C. EARLE,
MALCOLM P. NICHOLS.